US012801792B1

(12) United States Patent
Geada et al.

(10) Patent No.: US 12,801,792 B1
(45) Date of Patent: Nov. 17, 2026

(54) MODEL CHECKSUMS VIA DETERMINISTIC GRAPH TRAVERSALS

(71) Applicant: Red Hat, Inc., Raleigh, NC (US)

(72) Inventors: Robert Joao Geada, Newcastle upon Tyne (GB); Alex Ross Creasy, Newcastle upon Tyne (GB)

(73) Assignee: Red Hat, LLC, Raleigh, NC (US)

( * ) Notice: Subject to any disclaimer, the term of this patent is extended or adjusted under 35 U.S.C. 154(b) by 0 days.

(21) Appl. No.: 19/091,407

(22) Filed: Mar. 26, 2025

(51) Int. Cl.
*G06F 21/64* (2013.01)
*G06F 21/44* (2013.01)
*G06N 20/00* (2019.01)

(52) U.S. Cl.
CPC .............. *G06F 21/64* (2013.01); *G06F 21/44* (2013.01); *G06N 20/00* (2019.01)

(58) Field of Classification Search
CPC .......... G06F 21/64; G06F 21/44; G06N 20/00
See application file for complete search history.

(56) References Cited

U.S. PATENT DOCUMENTS

2022/0103186 A1 3/2022 Kaminitz et al.
2022/0351239 A1* 11/2022 Eletreby ............ G06Q 30/0242
2023/0084892 A1* 3/2023 Bliss ...................... G06N 20/00 382/110
2023/0334344 A1* 10/2023 Almasan ............. G06F 16/2255
2024/0273397 A1* 8/2024 Narayanan ............. G06N 20/00
2025/0068773 A1* 2/2025 Shi ........................ H04L 9/3239
2025/0190784 A1* 6/2025 Dialani ................. H04L 9/3218

OTHER PUBLICATIONS

Extended European Search Report for EP Patent Application No. 25225119.4, dated May 18, 2026, 8 pages.
Xiong, Cheng, et al., "Neural Network Model Protection with Piracy Identification and Tampering Localization Capability," Proceedings of the 30th ACM International Conference on Multimedia, https://doi.org/10.1145/3503161.3548247, ISBN 9781450392037, Oct. 10, 2022, 9 pages.
Javaheripi, Mojan, et al., "AccHashtag: Accelerated Hashing for Detecting Fault-Injection Attacks on Embedded Neural Networks," ACM Journal on Emerging Technologies in Computing Systems, vol. 19, Issue 1, Dec 9, 2022, 20 pages.

* cited by examiner

*Primary Examiner* — Vance M Little
(74) *Attorney, Agent, or Firm* — Dority & Manning, P.A.

(57) ABSTRACT

A computer-implemented method can include: capturing parameter data descriptive of values of parameters of a machine-learned model, the parameter data comprising a plurality of parameter lists respectively associated with a plurality of nodes of the machine-learned model, wherein the parameter data is captured during a forward-pass operation of the machine-learned model; sorting the parameter data to generate a sorted set of parameter lists; generating a plurality of parameter checksums, each checksum corresponding to one of the parameter lists of the sorted set of parameter lists; generating a model checksum of the plurality of parameter checksums; and authenticating the machine-learned model based on the model checksum.

20 Claims, 4 Drawing Sheets

MODEL CHECKSUMS VIA DETERMINISTIC GRAPH TRAVERSALS

BACKGROUND

Machine-learning is a field of study in artificial intelligence (AI) that focuses on creating systems that can be trained to learn patterns and features in data and extrapolate from that data to new data without being explicitly programmed or trained on the new data.

SUMMARY

The present disclosure provides for verifying that an instance of a machine-learned model matches a known instance of the machine-learned model at an earlier time. A computing system can capture parameter data from the machine-learned model during a forward pass operation (e.g., an inference operation) of the machine-learned model. The computing system can generate a model checksum from node-level checksums derived from the parameters of the machine-learned model. The model checksum can be compared to an earlier checksum from the same model instance to verify that the checksum is unchanged. The instance of the model can be thus authenticated without requiring serialization of the model to persistent storage.

In one implementation, a computing system is provided. The computing system includes one or more processor devices of one or more computing devices. The one or more processor devices are to capture parameter data descriptive of values of parameters of a machine-learned model. The parameter data can include a plurality of parameter lists respectively associated with a plurality of nodes of the machine-learned model. The parameter data can be captured during a forward-pass operation of the machine-learned model. The one or more processor devices are to sort the parameter data to generate a sorted set of parameter lists. The one or more processor devices are to generate a plurality of parameter checksums, each parameter checksum of the plurality of parameter checksums corresponding to one of the parameter lists of the sorted set of parameter lists. The one or more processor devices are to generate a model checksum of the plurality of parameter checksums. The one or more processor devices are to authenticate the machine-learned model based on the model checksum.

In another implementation, a method is provided. The method includes capturing parameter data descriptive of values of parameters of a machine-learned model. The parameter data can include a plurality of parameter lists respectively associated with a plurality of nodes of the machine-learned model. The parameter data can be captured during a forward-pass operation of the machine-learned model. The method includes sorting the parameter data to generate a sorted set of parameter lists. The method includes generating a plurality of parameter checksums, each parameter checksum of the plurality of parameter checksums corresponding to one of the parameter lists of the sorted set of parameter lists. The method includes generating a model checksum of the plurality of parameter checksums. The method includes authenticating the machine-learned model based on the model checksum.

In another implementation, a non-transitory computer-readable storage medium is provided. The non-transitory computer-readable storage medium includes executable instructions to cause a processor device to capture parameter data descriptive of values of parameters of a machine-learned model. The parameter data can include a plurality of parameter lists respectively associated with a plurality of nodes of the machine-learned model. The parameter data can be captured during a forward-pass operation of the machine-learned model. The executable instructions further cause the processor device to sort the parameter data to generate a sorted set of parameter lists. The executable instructions further cause the processor device to generate a plurality of parameter checksums, each parameter checksum of the plurality of parameter checksums corresponding to one of the parameter lists of the sorted set of parameter lists. The executable instructions further cause the processor device to generate a model checksum of the plurality of parameter checksums. The executable instructions further cause the processor device to authenticate the machine-learned model based on the model checksum.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
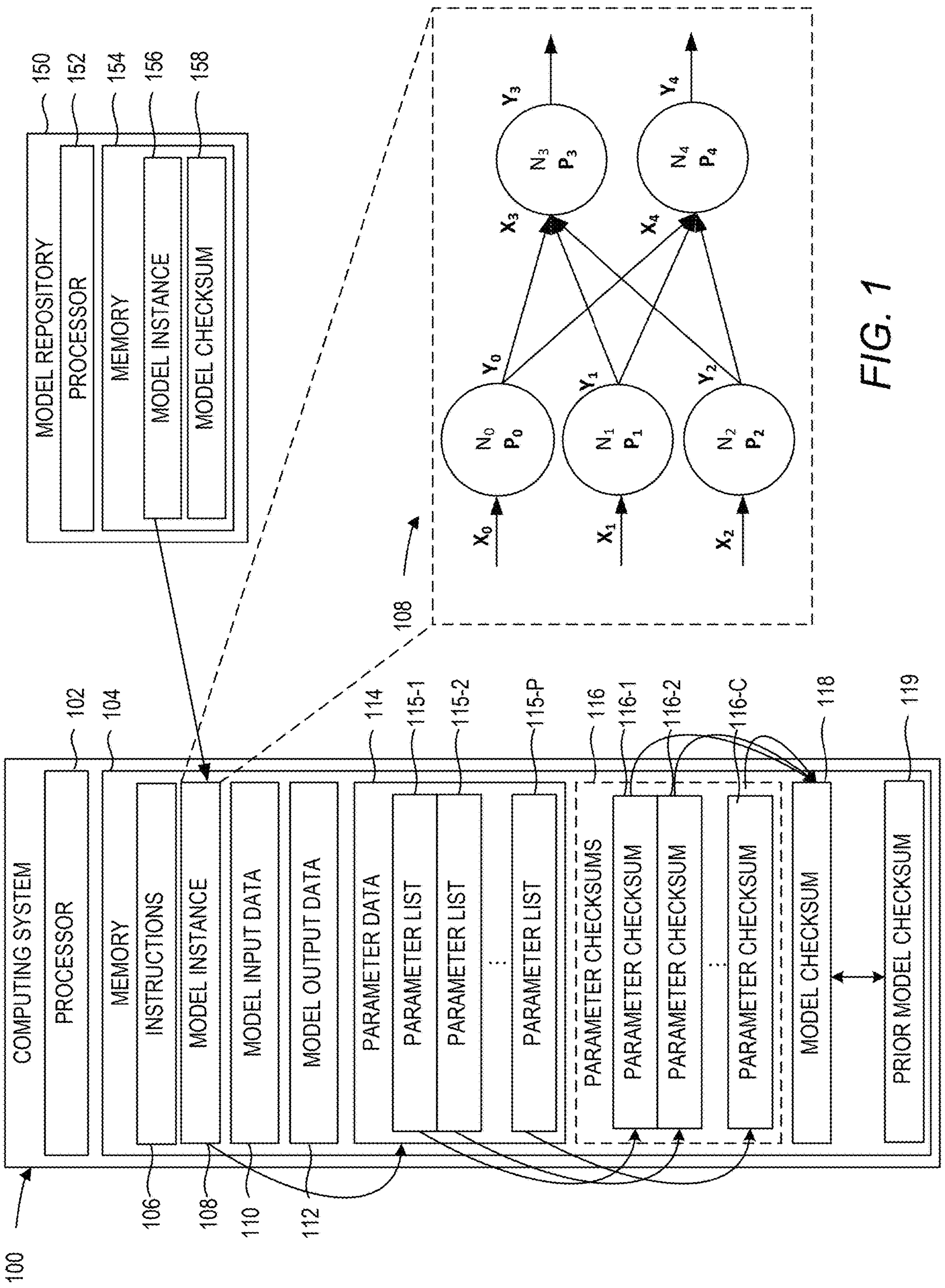
FIG. 1 depicts an example system according to example implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

The present disclosure provides systems and methods for model checksums via deterministic graph traversals. Once a machine-learned (ML) model has been distributed and/or deployed across a variety of instances, it can be beneficial to periodically verify that the deployed instance of a model matches the original so-called "seed" copy of the model. Verifying the integrity of the instance of a machine-learned model can provide safeguards against a variety of issues and/or potential vulnerabilities, such as, for example, model corruption, accidental backpropagation, malicious attacks, or other issues.

One approach to verifying the integrity of a model instance is to compare model binaries, such as by checking that their file serializations are identical. Serializing models for verifying integrity suffers from a number of drawbacks, however. First, verifying serialized model binaries requires storage of and access to a trusted master copy of the model binary. This can double the overall storage cost of a given deployment and can be unreliable in cases where access to the trusted master copy is not guaranteed (e.g., in isolated computing devices). Additionally, the serialization process must be guaranteed to preserve equality of serialized objects, which is not a guarantee in many conventional model serialization approaches. Furthermore, the deployed model must be serialized to storage at every comparison instance, which can be computationally expensive and/or can delay operation of the model.

The present disclosure provides a solution to these and other problems. In particular, the present disclosure provides for authenticating a machine-learned model based on parameter data captured during a forward pass operation of the machine-learned model. Example aspects of the present disclosure provide a deterministic, arbitrarily secure, and framework-agnostic process to produce in-memory model checksums, to compare equality of deployed models without requiring any serialization of the models.

According to example aspects of the present disclosure, parameter data can be captured during a forward pass operation of a machine-learned model. The parameter data can include a plurality of parameter lists respective to a plurality of nodes. For example, each node can have a single associated parameter list. The parameter data can therefore be represented by a list of pairs (N, P), where N is a particular node and P is a list (e.g., vector) of parameter values for parameters at the model operation corresponding to N. The parameter data can include nodes representing all operations in a model and/or a subset of all operations in the model.

As one example, an input trace can be used to capture parameter data of the model, and an inference graph G can be constructed based on the input trace. The inference graph can be a directed graph that describes the structure of the machine-learned model as a plurality of nodes describing some operation or data transformation within the model (e.g., convolution, attention block, etc.), and edges describing connectivity between the plurality of nodes. For static models (e.g., models wherein the data flow is invariant over time and with respect to input data), inference graphs may be connected such that most if not all operations are used as data flows through the model. For instance, in some implementations, the inference graphs may be strongly-connected graphs.

Additionally and/or alternatively, the parameter lists can be sorted according to some predetermined sorting strategy. The sorting strategy can be invariant to the original list order to provide a deterministic ordering of the sorted parameter list. Additionally, the sorting strategy can be selected to provide some desired level of security. For example, more complex sorting strategies can provide improved security by being less likely to provide identical checksums for distinct models and/or by being more challenging to guess or reverse engineer. Furthermore, in parallelized models, sorting the parameter lists can remove potential variations in the ordering of the parameter list resulting from the order in which the parallelized operations are performed, which may otherwise cause disparate checksums for otherwise identical model evaluations. Simpler sorting strategies, such as soring the parameter lists by increasing or decreasing values of the first parameter value within each parameter list, can provide lower computational overhead.

Subsequent to sorting the parameter lists, a parameter-wise checksum operation can be performed for each of the plurality of parameter lists to create a list of parameter checksums. For instance, each parameter checksum can correspond to a single node of the plurality of nodes in the parameter data and/or the inference graph. In some implementations, the parameter checksums may be performed for only a selected subset of the parameter lists in the parameter data. Additionally and/or alternatively, in some implementations, items in the checksum list may be repeated and/or reordered arbitrarily and/or predictably to provide an additional layer of complexity in the checksum operation. A second, model-level checksum operation can be performed across the list of parameter checksums and/or a subset of the list of parameter checksums to generate a model checksum. According to example aspects of the present disclosure, this model checksum can be near-uniquely correlated to values of the parameters of a machine-learned model, such that variations in the values of the parameters will produce nearly unpredictable variations in the model checksum. A detected change in the checksum, therefore, can be indicative of a change in the parameter values of an underlying model.

The present disclosure provides a number of technical effects and benefits including improvements to computer-related technology, such as, for example, the computer-related field of machine-learned model authentication and security. Aspects of the present disclosure, such as authenticating a machine-learned model based on a model checksum computed from parameter data captured during a forward pass operation of the machine-learned model, provide for a computing system to achieve security guarantees regarding the machine-learned model. For example, the present disclosure can provide for authenticating that parameter data of the machine-learned model has not changed compared to a prior instance of the model.

Additionally, aspects of the present disclosure, such as authenticating a machine-learned model based on a model checksum computed from parameter data captured during a forward pass operation of the machine-learned model, provide for comparing in-memory models across separate memory spaces. Furthermore, the models can be compared without disturbing or altering the in-memory models, such as, for example, by serializing the models to store them in persistent storage. Because serializing the models can be a computationally expensive process requiring computations to be performed on a significant number of model parameters and further requires that the models be taken out of a runtime instance to be stored on nonvolatile memory, the present disclosure can provide for a significant reduction in computing resource usage compared to approaches that involve serializing a machine-learned model. Still further, because the parameter data can be captured during a forward pass operation (e.g., an inference operation), the authentication of the model can happen "passively" in volatile memory alongside standard operation or use of the model. The present disclosure can therefore provide for improved latency of computing systems implementing the authenticated machine-learned model, as the authentication can be performed without interrupting evaluation of the machine-learned model.

As used herein, a "model parameter" or simply "parameter" refers to a numeric parameterization of a particular model operation. For instance, at each node or neuron of the machine-learned model, one or more operations may be defined as a combination of inputs to the node according to some weights, activations, filter, or other parameters. For example, the operation may be mathematically represented as f if y=f(x, p), where x is inbound data to a node, y is outbound data from the node, and p is a parameter list. It should be understood that the mathematical representation described above is provided for explanatory purposes and is not intended to be limiting on the present disclosure. The weights, activations, filters, convolutions, and other model parameters of a given node can be captured in the parameter data respective to the node.

FIG. 1 is a block diagram of an example computing system 100 according to example implementations of the present disclosure. The computing system 100 can include a processor 102 coupled to a memory 104. The memory 104 can store instructions 106 to cause the processor 102 to perform operations comprising any of the aspects described herein.

The computing system can implement or otherwise operate a machine-learned model instance (or simply "model instance") 108. The model instance 108 can be an in-memory instance of a given machine-learned model. For example, the model instance 108 can be loaded into a volatile memory, such as random access memory (RAM) or other type of memory suitable for performing forward pass operations using the model instance 108. For example, the model instance 108 may be capable of receiving model input data 110 (e.g., text data, audiovisual data, or other suitable computer-readable data) and/or outputting model output data 112 (e.g., predictions).

In some implementations, the machine-learned model in model instance 108 can be or can include a plurality of model operations. For instance, the model can define a sequence (or sequences, e.g., parallel sequences) of operations to be performed on data as it progresses through the model. Example machine-learned models include neural networks (e.g., artificial neural networks), decision trees, support-vector machines (SVMs), transformer models, and regression models.

One example model instance 108 is diagrammatically illustrated in the dashed box in FIG. 1. It should be understood that the illustration of model instance 108 is provided for the purpose of explaining example aspects of the present disclosure, and is not intended to be limiting on the structure of model instance 108 unless otherwise indicated. The model instance 108 is represented as an inference graph. For instance, the model instance 108 includes a plurality of nodes $N_n$ each corresponding to an operation, such as a weighted combination of inputs $X_n$, activation(s), or other operations. The operations of the model instance 108 can be defined by and/or performed with respect to one or more model parameters $P_n$ respective to each node (e.g., operation). For example, the model parameters can include weights respective to the inputs $X_n$ for biasing the inputs. As another example, an activation operation can include one or more model parameters defining values at which the activation function is activated. Other model operations, such as convolutions, attention mechanisms, etc. can similarly be defined by model parameters. Based on the inputs $X_n$, each node can produce a set of one or more outputs $Y_n$. The outputs can be propagated as inputs to a next set of nodes or can be the eventual output of the model instance 108 (e.g., the model output data 112). The propagation of data through the model instance 108 between nodes is represented by directed edges between the nodes. This propagation, when performed across the entire model instance 108, can be referred to as a forward pass operation, such as an inference operation. For example, an inference operation can refer generally to obtaining a prediction from the model instance 108 as part of some task, such as a data generation task, a content generation task, a token generation task, or another suitable task.

According to example aspects of the present disclosure, the computing system 100 can obtain parameter data 114 comprising a plurality of parameter lists 115-1-115-P, where P is the number of parameter lists (collectively, "parameter lists 115"). Each parameter list 115 can be or can include a set of at least some of the parameters $P_n$ of a particular node in the model instance 108. In some implementations, the number of parameter lists P can be equivalent to the number of nodes in the model instance 108. For example, each parameter list 115 can correspond to the parameters of exactly one node in the model instance 108. Alternatively, in some implementations, the parameter lists 115 may correspond to only a subset of all nodes in the model instance 108. For example, capturing the parameter data 114 may include selecting a subset of nodes of the model instance 108 and capturing model parameters from the selected subset of nodes. In some implementations, the parameter data 114 may therefore include a list of pairs (N, P) of nodes paired with identifying parameter lists 115.

In some implementations, a parameter list 115 can include each model parameter from a particular node. In some implementations, the parameter list 115 can include only a subset of all available parameters at a particular node. For example, the parameter list 115 may include a subset of the weights at a node, such as every other weight, every third weight, and so on. Generally, if a subset of parameters is selected, that subset may be captured consistently across all nodes such that the selection process can be invariant to the order in which the nodes are maintained in memory.

In some implementations, the parameter data 114 can be or can include an inference graph representation of the machine-learned model of the model instance 108. The inference graph representation can describe inference relationships between the plurality of nodes of the machine-learned model. For instance, the inference graph representation may be or may resemble the representation of the model instance 108 depicted in the dashed box of FIG. 1.

In some implementations, to capture the parameter data, the computing system is to perform an input trace on the machine-learned model (e.g., the model instance 108). In the context of machine-learning, tracing refers to capturing data flow and processing during execution of a machine-learned model. Tracing can provide information about stages of operation of a machine-learned model from input to output, even when conventional structural information about a machine-learned model is unavailable or, in the case of the present disclosure, may not be trusted even if available. For instance, a serialized version of the machine-learned model instance may readily define information such as model parameters for storage in non-volatile memory. However, when the model is loaded into volatile memory (e.g., memory 104) for execution (e.g., as model instance 108), this information may not be readily available or applicable. As one example, the model may be loaded non-sequentially into a memory stack for execution such that relationships between operations are not readily ascertainable.

To perform an input trace on the model instance 108, the system 100 can be configured to record changes in the model instance 108 in response to input. For example, if the model instance 108 does not define its connectivity in a readily ascertainable manner, the input trace can provide for detecting how input propagates through the model instance 108 and suggest connections between operations within the model instance. As the input trace is progressing, a "snapshot" of the parameters can be captured and used to form the parameter lists 115. Furthermore, in some implementations, the input trace can be performed using inputs of a forward pass operation (e.g., an inference operation) of the machine-learned model instance.

In some implementations, the system 100 can transform the parameters of the model instance 108 to facilitate subsequent processing. For example, in some implementations, the parameter data 114 can be captured as tensor data and flattened into parameter lists 115 respective to a unit of the model instance 108 (e.g., a node or layer). For instance, in some implementations, to capture the parameter data, the system 100 is to obtain a plurality of parameter tensors respective to each node of the plurality of nodes in the model instance 108, flatten the plurality of parameter tensors to produce a plurality of parameter vectors respective to the node of the plurality of nodes, and concatenate the plurality of parameter vectors to produce a parameter list of the plurality of parameter lists.

In some implementations, some nodes of the model instance 108 may not include parameters. For example, some nodes may be constant or may otherwise not be configurable within the model architecture. For these nodes, the inputs and outputs of the node can be used as proxy parameters in generating a parameter list 115 respective to the node. For example, in some implementations, to capture the parameter data, the system 100 is to capture input of a node of the plurality of nodes as a parameter list 115 of the plurality of parameter lists 115. Additionally and/or alternatively, in some implementations, to capture the parameter data, the system 100 is to capture output of a node of the plurality of nodes as a parameter list 115 of the plurality of parameter lists 115. In some implementations, capturing the input or output of the node as the parameter list is performed in response to determining that the node does not include parameters.

The system 100 can generate parameter checksums 116-1-116-C, where C is a number of parameter checksums, (collectively parameter checksums 116) based on the parameter data 114. The parameter checksums 116 can be summations of values in the parameter lists 115. For example, each parameter list 115 can be summed to generated a respective parameter checksum 116 (e.g., such that C is equivalent to P). In some implementations, values may be repeated or reordered in the parameter data 114 according to a predictable reordering or predictable repetition. Repeating or reordering values in the parameter data 114 before generating the parameter checksums 116 can further increase the complexity of the checksumming operation and/or can further obfuscate relationships between changes in the checksums and changes in model parameters.

In some implementations, the system 100 can sort the parameter data 114 prior to generating the parameter checksums 116. Sorting the parameter data 114 can provide for improved security and/or consistency across instances. As one example, the system 100 can sort the parameter data with respect to parameter values at a fixed position across the plurality of parameter lists 115. For instance, the parameter data 114 can be sorted in a predictable manner such as sorting by values of an arbitrary position within the parameter lists 115. Sorting the parameter data can provide that variations in the ordering of the parameter lists 115 (e.g., due to model parallelization or disparities in runtime operation) do not affect the value of the checksums. Additionally, the sorting technique can introduce an additional layer of complexity that can increase the resilience of the system 100 to reverse engineering.

The system 100 can generate a model checksum 118 based on the parameter checksums 116. For instance, the system 100 can perform a checksum operation to sum or otherwise combine the parameter checksums 116 and generate the model checksum 118. The model checksum 118 can be an integer value, a floating point value, or other suitable computer-readable data value. The model checksum 118 may also be associated with metadata such as a timestamp, model identifier (e.g., corresponding to model instance 108), or other suitable metadata.

The model checksum 118 can be generated based on a set including each of the parameter checksums 116. Alternatively, in some implementations, the model checksum 118 can be generated based on a subset of the plurality of parameter checksums 116. For example, the model checksum 118 can be generated using only some of the parameter checksums to add additional complexity to the checksum operation. Additionally and/or alternatively, in some implementations, generating the model checksum 118 can include inserting one or more repeated values in a set comprising the plurality of parameter checksums 116. For example, some or all of the plurality of parameter checksums 116 may be repeated (as the repeated value(s)) such that multiple parameter checksums 116 correspond to a single parameter list 115. Additionally and/or alternatively, in some implementations, other values (e.g., consonants) may be repeated as the repeated values. Additionally and/or alternatively, generating the model checksum 118 can include reordering a set comprising the plurality of parameter checksums 116. For instance, if a subset of the parameter checksums 116 is used and/or if the parameter checksums 116 are not combined equally, reordering the plurality of parameter checksums 116 can introduce additional complexity providing for improved resilience against reverse engineering.

In some implementations, same or different checksum operations can be used to compute the parameter checksums 116 and/or the model checksum 118. For example, in some implementations, generating the plurality of parameter checksums 116 includes performing a first checksum operation generating the model checksum 118 includes performing the first checksum operation. In some implementations, generating the plurality of parameter checksums 116 includes performing a first checksum operation generating the model checksum 118 includes performing a second checksum operation that is different from the first checksum operation. As used herein, a checksum operation refers to a set of one or more operations for combining of a plurality of values (e.g., parameter lists 115 or parameter checksums 116) for the purposes of producing a checksum. The checksum operation may be a linear operation (e.g., addition or multiplication) or a non-linear operation (e.g., a polynomial combination).

The system 100 can authenticate the model instance 108 based on the model checksum 118. For instance, the system 100 can verify whether the model checksum 118 (and, therefore, the model instance 108) is consistent with an earlier or expected model instance 108. As one example, the system 100 can store a prior model checksum 119. The prior model checksum 119 can be computed as described with respect to the model checksum 118, but for an earlier forward pass operation through the model instance 108. As one example, the prior model checksum 119 can be a second model checksum computed during a second (e.g., prior) forward pass operation. The system 100 can compare the model checksum 118 and the prior model checksum 119. For example, the system can determine whether the model checksum 118 and the prior model checksum 119 are identical. The system 100 can authenticate the model instance 108 based on the comparison between the model checksum 118 and the prior model checksum 119. As one example, if the prior model checksum 119 is different from the model checksum 118, the model instance 108 is likely to have changed from a prior point in time. If this change is unexpected (e.g., due to accidental backpropagation), the model instance 108 can be flagged as not authenticated or validated, which may cause suspending the model instance 108, reloading the model instance 108, discarding a prediction from the model instance 108, or otherwise altering operation of the system 100.

As another example, in some implementations, the model instance 108 can be obtained (e.g., downloaded) from a model repository 150. The model repository 150 may be or may include a memory device coupled to the computing system 100 (e.g., by one or more interfaces, such as a serial interface). Additionally and/or alternatively, the model repository 150 may be maintained at a separate computing system from the computing system 100 (e.g., a server computing system) and/or coupled to the computing system 100 via one or more networks. For example, the model repository 150 may host a variety of machine-learned models for download and use by other computing systems.

The model repository 150 can optionally include a processor 152. The model repository 150 can include a memory 154 (e.g., a non-transitory, non-volatile memory, such as a solid state drive, hard disc drive, magnetic reel, or other non-volatile memory). The memory 154 can store a model instance 156. For instance, the model instance 156 may be a serialized model instance that is stored in persistent memory. The model instance 156 may not presently be operable to perform tasks (e.g., due to being serialized) but may be readily stored and/or transmitted. For example, the computing system 100 may access the model instance 156 at memory 154 in a serialized, persistent form, and load the model instance 156 into the memory 104 as model instance 108 (e.g., in a form suitable for performing inference). The model repository 150 may optionally store a model checksum 158 associated with the model instance 156. The model checksum 158 can represent an expected or intended value of the checksum for the model instance 156. The computing system 100 can compute the model checksum 118 and compare the model checksum 118 to the model checksum 158 to verify that the model instance 108 corresponds to the model instance 156.

Because the processor 102 is a component of the computing system 100, functionality implemented by the processor 102 may be attributed to the computing system 100 generally. Moreover, in examples where the instructions 106 comprise software instructions that program the processor 102 to carry out functionality discussed herein, functionality implemented by the instructions 106 may be attributed herein to the processor 102.

Figure 2:
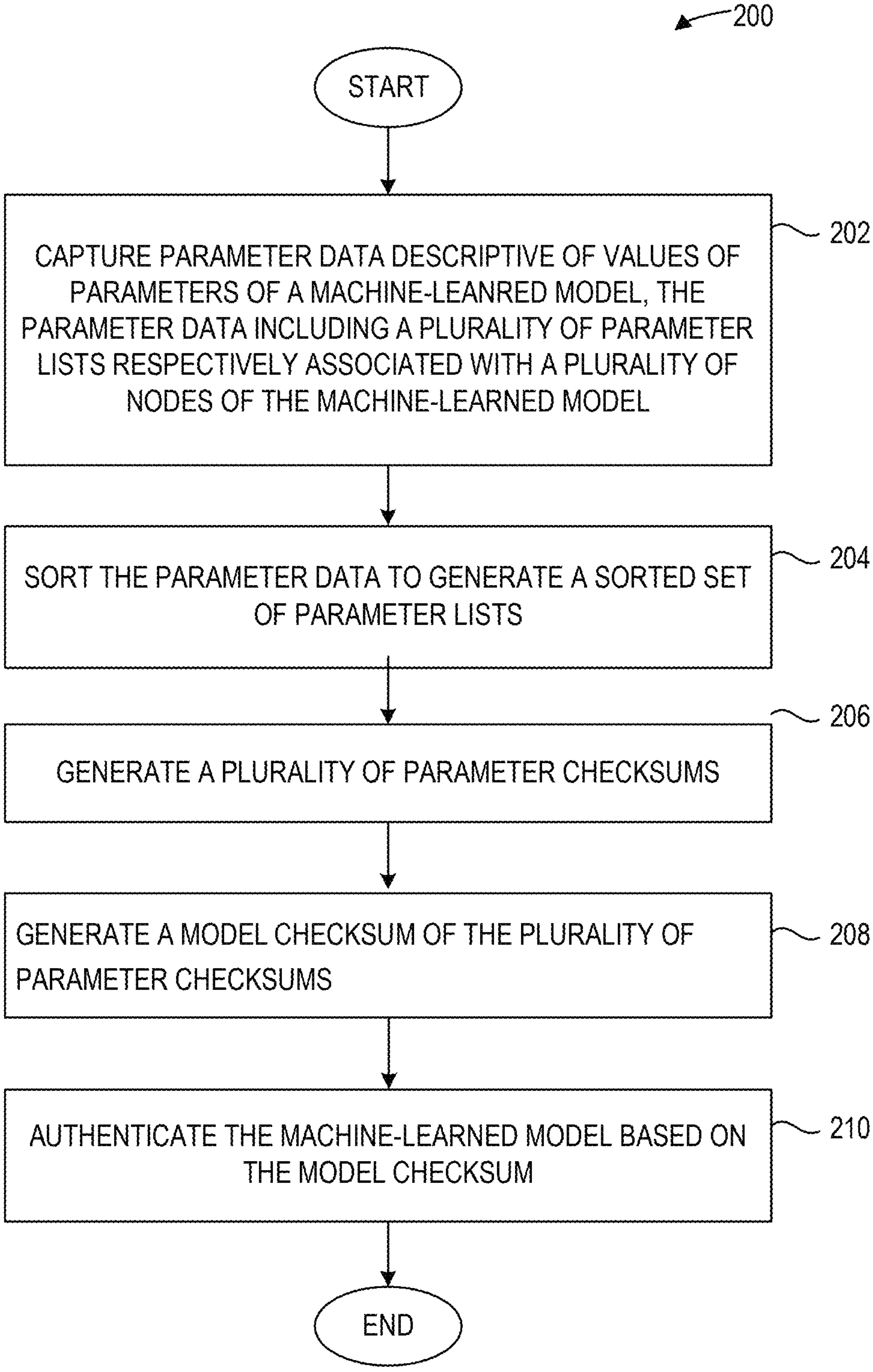
FIG. 2 depicts a flowchart diagram of an example method according to example implementations of the present disclosure.

FIG. 2 depicts a flowchart diagram of an example method 200 according to example implementations of the present disclosure. The method 200 includes, at 202, capturing parameter data descriptive of values of parameters of a machine-learned model, the parameter data comprising a plurality of parameter lists respectively associated with a plurality of nodes of the machine-learned model, wherein the parameter data is captured during a forward-pass operation of the machine-learned model. The method 200 includes, at 204, sorting the parameter data to generate a sorted set of parameter lists. The method 200 includes, at 206, generating a plurality of parameter checksums, each parameter checksum of the plurality of parameter checksums corresponding to one of the parameter lists of the sorted set of parameter lists. The method 200 includes, at 208, generating a model checksum of the plurality of parameter checksums. The method 200 includes, at 210, authenticating the machine-learned model based on the model checksum.

Figure 3:
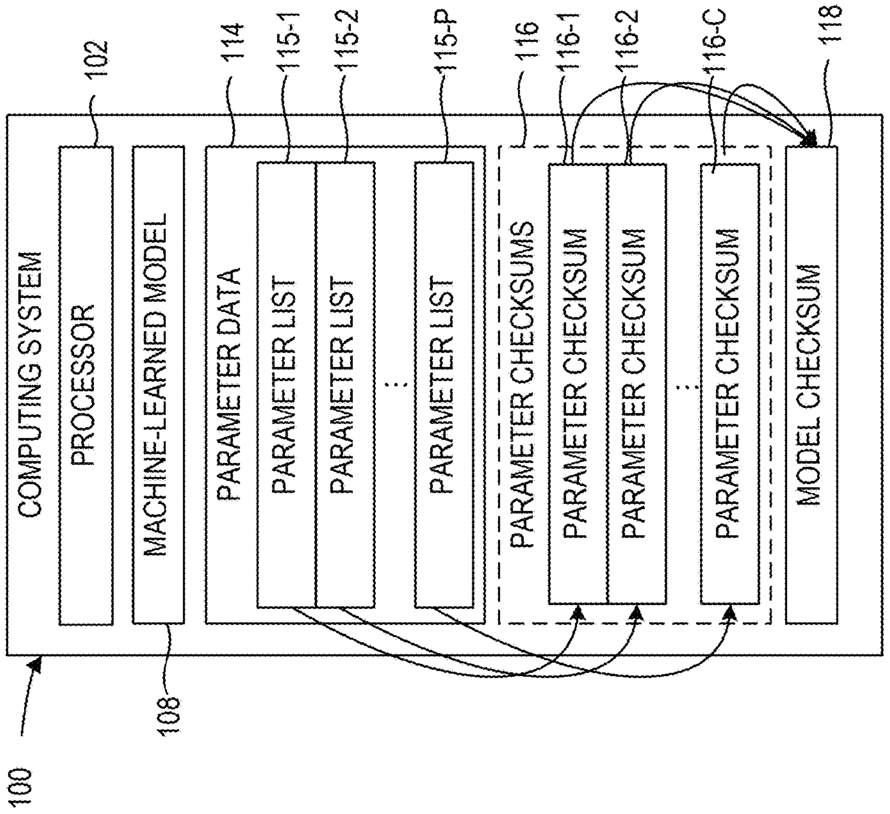
FIG. 3 depicts an example system according to example implementations of the present disclosure.

FIG. 3 is a block diagram of a system 300 according to some example implementations of the present disclosure. The system 300 includes one or more processor devices 102 to capture parameter data 114 descriptive of values of parameters of a machine-learned model 108, the parameter data including a plurality of parameter lists 115 respectively associated with a plurality of nodes of the machine-learned model 108, wherein the parameter data is captured during a forward-pass operation of the machine-learned model 108. The processor device(s) 102 are to sort the parameter data 114 to generate a sorted set of the parameter lists 115. The processor device(s) are to generate a plurality of parameter checksums 116, each parameter checksum 116 corresponding to one of the parameter lists 115 of the sorted set of parameter lists 115. The processor device(s) 102 are to generate a model checksum 118 of the plurality of parameter checksums 116. The processor device(s) are to authenticate the machine-learned model 108 based on the model checksum 118.

Figure 4:
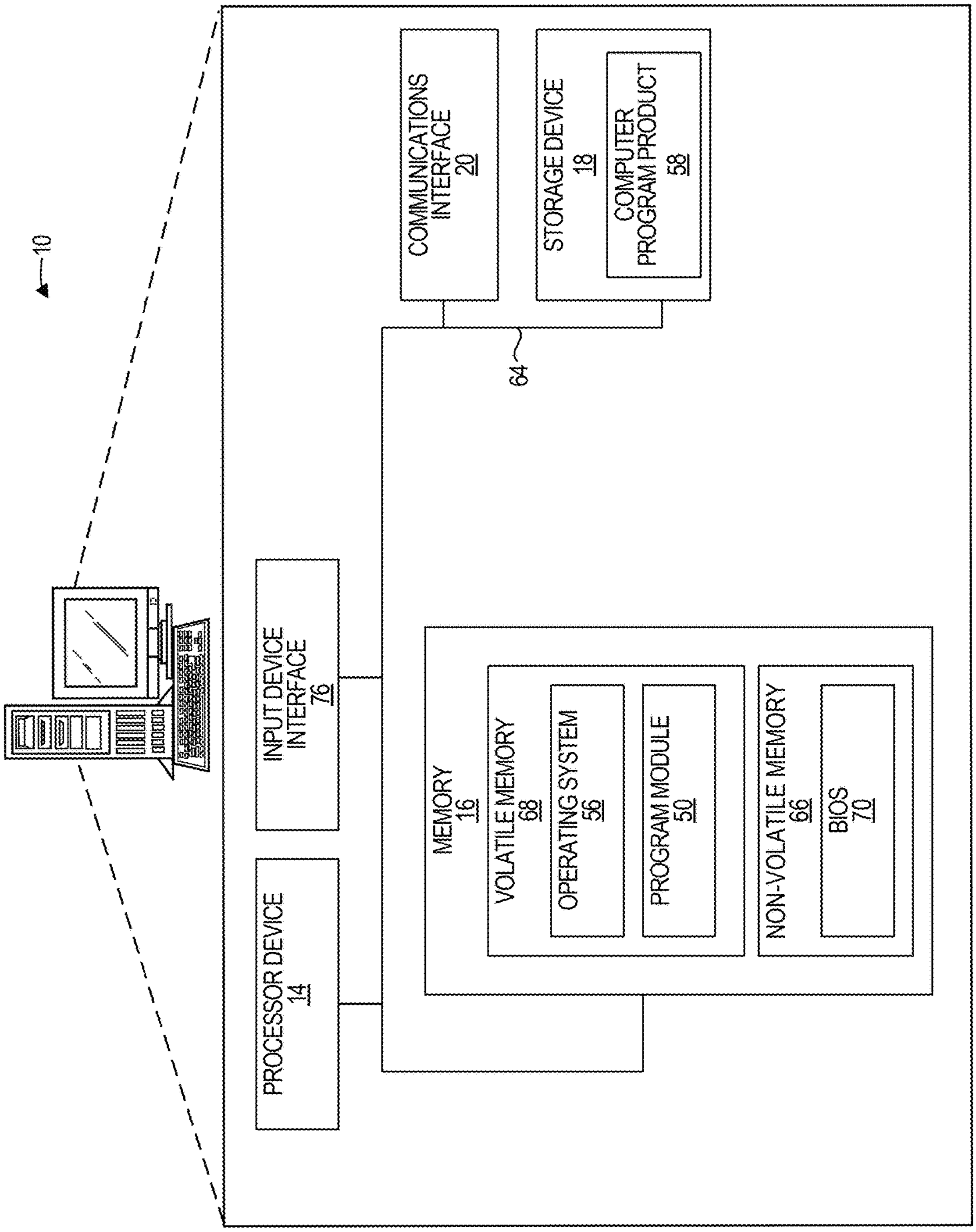
FIG. 4 depicts a block diagram of a computing device suitable for implementing examples according to one example.

FIG. 4 is a block diagram of a computing device 10 suitable for implementing examples according to one example. The computing device 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 10 includes a processor device 14, a system memory 16, and a system bus 64. The system bus 64 provides an interface for system components including, but not limited to, the system memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 10. The volatile memory 68 may also include a high-speed RAM, such as static RAM, for caching data.

The computing device 10 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like.

A number of modules can be stored in the storage device 18 and in the volatile memory 68, including an operating system and one or more program modules, such as the [file transfer module 26], which may implement the functionality described herein in whole or in part. All or a portion of the examples may be implemented as a computer program product 58 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14 may serve as a controller, or control system, for the computing device 10 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 10 may also include the communications interface 20, such as an Ethernet transceiver and/or a Wi-Fi transceiver, or the like, suitable for communicating with the network 50 as appropriate or desired. The computing device 10 may also include a video port 78 configured to interface with the display device, to provide information to the user 24.

Individuals will recognize improvements and modifications to the preferred examples of the disclosure. All such improvements and modifications are considered within the scope of the concepts disclosed herein and the claims that follow.

What is claimed is:

1. A computing system comprising:

one or more processor devices of one or more computing devices to:

capture parameter data descriptive of values of parameters of a machine-learned model, the parameter data comprising a plurality of parameter lists respectively associated with a plurality of nodes of the machine-learned model, wherein the parameter data is captured during a forward-pass operation of the machine-learned model;

sort the parameter data to generate a sorted set of parameter lists;

generate a plurality of parameter checksums, each parameter checksum of the plurality of parameter checksums corresponding to one of the parameter lists of the sorted set of parameter lists;

generate a model checksum of the plurality of parameter checksums; and authenticate the machine-learned model based on the model checksum.

2. The computing system of claim 1, wherein, to capture the parameter data, the one or more processor devices are to perform an input trace on the machine-learned model.

3. The computing system of claim 1, wherein the parameter data is captured during an inference operation of the machine-learned model.

4. The computing system of claim 1, wherein the parameter data comprises an inference graph representation of the machine-learned model, the inference graph representation describing inference relationships between the plurality of nodes of the machine-learned model.

5. The computing system of claim 1, wherein, to capture the parameter data, the one or more processor devices are to:

obtain a plurality of parameter tensors respective to each node of the plurality of nodes;

flatten the plurality of parameter tensors to produce a plurality of parameter vectors respective to the node of the plurality of nodes; and concatenate the plurality of parameter vectors respective to the node to produce a parameter list of the plurality of parameter lists.

6. The computing system of claim 1, wherein, to capture the parameter data, the one or more processor devices are to capture input of a node of the plurality of nodes as a parameter list of the plurality of parameter lists.

7. The computing system of claim 6, wherein capturing the input of the node as the parameter list is performed in response to determining that the node does not include parameters.

8. The computing system of claim 1, wherein, to sort the parameter data, the one or more processor devices are to sort the parameter data with respect to parameter values at a fixed position across the plurality of parameter lists.

9. The computing system of claim 1, wherein, to generate the plurality of parameter checksums, the one or more processor devices are to perform a first checksum operation; and wherein, to generate the model checksum, the one or more processor devices are to perform the first checksum operation.

10. The computing system of claim 1, wherein, to generate the plurality of parameter checksums, the one or more processor devices are to perform a first checksum operation; and wherein, to generate the model checksum, the one or more processor devices are to perform a second checksum operation that is different from the first checksum operation.

11. The computing system of claim 1, wherein the plurality of parameter checksums corresponds to a subset of the sorted set of parameter lists.

12. The computing system of claim 1, wherein the model checksum is generated based on a subset of the plurality of parameter checksums.

13. The computing system of claim 1, wherein, to generate the model checksum, the one or more processor devices are to insert one or more repeated values in a set comprising the plurality of parameter checksums.

14. The computing system of claim 1, wherein, to generate the model checksum, the one or more processor devices are to reorder a set comprising the plurality of parameter checksums.

15. The computing system of claim 1, wherein, the forward pass operation comprises a first forward pass operation and the model checksum comprises a first model checksum; and wherein, to authenticate the machine-learned model based on the model checksum, the one or more processor devices are to compare the first model checksum to a second model checksum generated during a second forward-pass operation of the machine-learned model.

16. A method comprising:

capturing, by a computing system comprising one or more computing devices, parameter data descriptive of values of parameters of a machine-learned model, the parameter data comprising a plurality of parameter lists respectively associated with a plurality of nodes of the machine-learned model, wherein the parameter data is captured during a forward-pass operation of the machine-learned model;

sorting, by the computing system, the parameter data to generate a sorted set of parameter lists;

generating, by the computing system, a plurality of parameter checksums, each parameter checksum of the plurality of parameter checksums corresponding to one of the parameter lists of the sorted set of parameter lists;

generating, by the computing system a model checksum of the plurality of parameter checksums; and authenticating, by the computing system, the machine-learned model based on the model checksum.

17. The method of claim 16, wherein the parameter data comprises an inference graph representation of the machine-learned model, the inference graph representation describing inference relationships between the plurality of nodes of the machine-learned model.

18. The method of claim 16, wherein capturing the parameter data comprises:

obtaining a plurality of parameter tensors respective to each node of the plurality of nodes;

flattening the plurality of parameter tensors to produce a plurality of parameter vectors respective to the node; and concatenating the plurality of parameter vectors respective to the node to produce a parameter list of the plurality of parameter lists.

19. The method of claim 16, wherein authenticating the machine-learned model based on the model checksum comprises comparing the model checksum to a second model checksum generated during a second forward-pass operation of the machine-learned model.

20. A non-transitory computer-readable storage medium that includes executable instructions to cause a processor device to:

capture parameter data descriptive of values of parameters of a machine-learned model, the parameter data comprising a plurality of parameter lists respectively associated with a plurality of nodes of the machine-learned model, wherein the parameter data is captured during a forward-pass operation of the machine-learned model;

sort the parameter data to generate a sorted set of parameter lists;

generate a plurality of parameter checksums, each parameter checksum of the plurality of parameter checksums corresponding to one of the parameter lists of the sorted set of parameter lists;

generate a model checksum of the plurality of parameter checksums; and authenticate the machine-learned model based on the model checksum.

* * * * *